United States Patent [19]

Laster et al.

[11] Patent Number: 4,884,248
[45] Date of Patent: Nov. 28, 1989

[54] METHOD OF RESTORING SEISMIC DATA

[75] Inventors: Stanley J. Laster; Robert A. Meek, both of Dallas; Thomas E. Shirley, Richardson, all of Tex.

[73] Assignee: Mobil Oil Corporation, New York, N.Y.

[21] Appl. No.: 303,199

[22] Filed: Jan. 30, 1989

Related U.S. Application Data

[63] Continuation-in-part of Ser. No. 148,307, Jan. 25, 1988.

[51] Int. Cl.$^4$ .......................... G01V 1/28; G01V 1/36
[52] U.S. Cl. ........................................ 367/73; 307/43; 364/421
[58] Field of Search ........................ 367/21, 38, 43, 47, 367/49, 73; 364/421, 576, 578; 324/331; 382/54

[56] References Cited

U.S. PATENT DOCUMENTS

| | | | |
|---|---|---|---|
| 2,187,765 | 8/1980 | Kinkade | 367/45 |
| 4,063,549 | 12/1977 | Beretskey et al. | 367/87 |
| 4,114,189 | 9/1978 | Davis | 364/718 |
| 4,204,279 | 5/1980 | Parrack et al. | 364/421 |
| 4,218,765 | 8/1980 | Kinkade | 367/45 |
| 4,380,059 | 4/1983 | Ruehle | 367/46 |
| 4,530,076 | 7/1985 | Dwyer | 367/135 |
| 4,570,122 | 2/1986 | Leu | 324/331 |
| 4,594,693 | 6/1985 | Pann et al. | 367/43 |

OTHER PUBLICATIONS

"A New Algorithm in Spectral Analysis and Band-Limited Extrapolation", Athanasios Papoulis, Iee Transactions on Circuits & Systems, vol. CAS-22, No. 9.
"Constrained Iterative Restoration Algorithms", Ronald W. Schafer et al., Proceedings of the IEEE, vol. 69, No. 4.
"Restoration of Missing Data by Least Squares Optimization", Jon F. Claerbout.
"Super-Resolution through Error Energy Reduction", R. W. Gerchberg Optica Acta, 1974, vol. 21, No. 9.
White, R. E.; "Signal and Noise Estimation . . . Methods", Proc. IEEE, vol. 72, #10, pp. 1340–1356, 10/84.
Zhu et al., "A Supplement to . . . (Fast Fourier Transform)", oil Geophys. Prop., vol. 4, pp. 75–78, 1981.
Shirley et al., "Restoration of Coherent Events or Mising Traces . . . ", 58th annu. Soc. Explor. Geophys. Int, 11/3/88, vol. 2. pp. 661–664.
Shirley et al., "Assessment of Modern Spectral . . . Spectra", 57th annu. Soc. Explor. Geophys. Int. Mtg., 10/15/87, pp. 607–610.
Schafer et al., "Constrained Iterative Restoration Algorithms", Proc. IEEE, vol. 69, #4, pp. 432–450, 4/81.
Claerfaut J. F., "Restoration of Missing Data By . . . Optimization", Stanford Exploration Project, Report #25, 10/80, pp. 1–16.

*Primary Examiner*—Nelson Moskowitz
*Attorney, Agent, or Firm*—Alexander J. McKillop; Charles J. Speciale; George W. Hager, Jr.

[57] ABSTRACT

Method for restoring seismic data to missing or severely noise contaminated traces included in a seismic section. The seismic section is transformed into a data localizing space and muted to retain only the localized data components of the seismic section. The muted transform space is inverse-transformed into the x-t domain to produce first estimates of the seismic data to be restored. The first estimates of the restored data are substituted for the corresponding traces in the original seismic section. Fully restored traces corresponding to the missing or severly noise contaminated traces are determined from the single estimate of the restored traces.

18 Claims, 5 Drawing Sheets

METHOD OF RESTORING SEISMIC DATA

RELATED APPLICATIONS

This application is a continuation-in-part of U.S. patent application Ser. No. 148,307 filed Jan. 25, 1988 pending, and hereby incorporated by reference as if reproduced in its entirety.

BACKGROUND OF THE INVENTION

This invention relates to seismic exploration and, more particularly, to a method for restoring missing or null seismic traces utilizing a single, non-iterative procedure equivalent to a generalized Papoulis-Gerchberg iteration for a transform which band-limits acquired seismic data. This invention further relates to a method for extrapolating recorded seismic data, again utilizing a single, non-iterative procedure equivalent to a generalized Papoulis-Gerchberg iteration for a transform which band-limits acquired seismic data.

In land-based seismic exploration, it is common practice to deploy a large array of geophones along a line of exploration on the surface of the earth and to record the vibrations of the earth at each geophone location to obtain a collection of seismic traces or seismograms. The traces are recorded as digital samples representing the amplitude of a received seismic signal as a function of time. In its most general sense, marine seismic exploration is similar to land exploration except that the seismic source and seismic receivers are towed behind an exploration vehicle which traverses a line of exploration along the ocean surface. In both cases, since seismograms are typically obtained along a line of exploration, the recorded digital samples can be formed into x-t arrays with each sample in the array representing the amplitude of the seismic signal as a function of horizontal distance and time. When such arrays are visually reproduced, by plotting or the like, seismic sections are produced. A seismic section depicts the subsurface layering of a section of the earth and is the principal tool which the geophysicist studies to determine the nature of the earth's subsurface. Before an array of seismic samples or traces can be converted into a seismic section for interpretation by geophysicists, the array must be extensively processed to remove noise and to make reflection events discernible.

It will be appreciated by those skilled in the art of seismic exploration that practical problems sometimes result in seismic traces with no recorded data or seismic traces that contain severe local contamination. In the case of severe contamination of the seismic data, removal of the contaminated data from the seismic section is often mandated. Therefore, while the two practical problems are both different in origin and impact on the seismic data, both may lead to seismic sections which contain either gaps in the traces or entire traces which have been excluded from the section. Indeed, in many such cases one or more gaps in individual traces and/or one or more null traces among otherwise normal seismic traces can result.

For this reason, it is a common problem in seismic exploration to be confronted with the presence of either seismic traces containing no recorded data or seismic traces that clearly contain severe noise contamination. Severe noise contamination—including coherent noise—can result from numerous sources including random bursts of noise, multiple or intrabed reflections or ground roll. Under severe conditions, the coherent noise is capable of dominating the seismic data. For example, direct arrivals in acquired marine seismic data and refraction energy in acquired land seismic data can dominate parts of the prestacked seismic section.

On the other hand, a missed shot by the seismic source, the failure of a geophone, or a dead channel between the geophone and the recorder can result in a seismic section which includes traces without data. Surprisingly, the impact of a missing trace on an otherwise normal seismic section can be quite severe. A missing seismic trace acts like a gap in a coherent event and can be viewed as a spatial negative spike with sufficient amplitude to cancel out coherent events. A multichannel processing algorithm used to remove large coherent noise events from the seismic record would react to the gap as it would to a spike added to the data, thereby producing additional processing noise in the form of an extraneous impulse response.

Standard practice among geophysicists faced with seismic traces containing either no recorded data or severely contaminated recorded data has been to exclude such traces, commonly referred to as "null" traces, from the otherwise satisfactory data set. The remaining seismic data would then be processed without the excluded data. The drawback to such a procedure is that a substantial amount of processing noise would be added to the trace due to the characteristic of missing traces acting like negative spikes and proper interpretation of the seismic section would be obscured.

On occasion, the null trace is necessary for proper processing of the seismic data. Under these circumstances, it was common practice to attempt to restore the null trace by creating a new trace characterized by seismic events consistent with nearby coherent events. Such an approach focused upon combining x-t domain traces near the missing trace to create the missing trace.

Various applications of F-k spectrum analysis and filtering are well known in the art. See U.S. Pat. No. 4,218,765 issued to Kinkade, U.S. Pat. No. 4,380,059 issued to Ruehle and U.S. Pat. No. 4,594,693 issued to Pann et al. Such techniques have been applied to seismic sections in an attempt to solve the problems described above. F-k spectrum analysis and filtering is particularly useful when seismic data is contaminated by large amplitude, coherent noise which obscures geologically significant signals because the coherent noise is often concentrated in a different part of the f-k spectrum than the signal. In such cases, f-k filtering can be used to attenuate the coherent noise, thereby revealing the seismic signals for interpretation.

Under some circumstances, however, f-k filtering is not recommended as processing noise capable of interfering with prestack interpretation and other well known processing techniques may be generated. For example, the f-k filtering of seismic data to remove coherent noise does not produce satisfactory results when null traces interrupt large amplitude coherent events which are to be filtered out using an f-k filter discriminating primarily on dip. In these situations, significant processing noise appears in the form of an edge effect, i.e. a noisy trace or traces adjacent to the gap resulting from the abrupt interruption of the coherent event. In the past, common practice was to either ignore or mute out the produced processing noise.

By ignoring this type of noise, other prestack multichannel data processing algorithms may create still more noise. If it is large enough, the processing noise will be seen in the stack by disrupting primary reflections, thereby adversely affecting interpretation. By muting out the processing noise which contaminates both the missing trace and adjoining traces, a larger gap which interrupts coherent events is formed. It will follow, therefore, that other prestack multichannel algorithms operating on the data with an enlarged gap will create additional processing noise requiring the muting out of still more traces. By muting traces, however, the effective fold of the data is reduced, thereby reducing the effectiveness of stacking.

Iterative procedures for extrapolating band-limited functions have been discussed in the signal processing literature for several years. The publication entitled Athanasios Papoulis, "A New Algorithm in Spectral Analysis and Band-Limited Extrapolation", *IEEE Transactions on Circuits and Systems*, Vol. Cas-22, No. 9, September, 1975, pgs. 735-742 discloses an algorithm for computing the transform of a band-limited function by application of an iterative process involving the discrete Fourier series and the fast Fourier transform. Papoulis proposes an iterative extrapolation technique for determining the Fourier transform F(w) of a band limited function f(t) in terms of a finite segment g(t) of f(t). See also R. W. Gerchberg, "Super-resolution through Error Energy Reduction", *Optica Acta*. Vol. 21, No. 9, 1974, pgs. 709-720 and Athanasios Papoulis,, *Signal Analysis*, Ch. 7, 1977, pgs. 221-261.

A similar iterative procedure for data restoration was disclosed by J. F. Claerbout, "Restoration of Missing Data by Least Squares Optimization", *Stanford Exploration Project*, Report No. 25, October, 1980, pgs. 1-16. In Claerbout, the data space was comprised of two parts—the raw data r and values x to be placed in gaps. The data space (x,r) is mapped into a column vector with the known data r in the bottom part of the vector and the unknown part x in the top. Once in model space, a weighted quadratic form is produced by premultiplying the transform by its transpose, placing in the middle a diagonal matrix of weights W. The derivative of the quadratic form with respect to x is set to zero and dx is determined by solution of a set of simultaneous equations for dx. Matrix x is updated to x+dx and the procedure repeats in an iterative method.

R. W. Schafer et al, "Constrained Iterative Restoration Algorithms", *Proceedings of the IEEE*, Vol. 69, No. 4, April 1981, pgs. 432-450 describes iterative techniques for removing the effects of distortion on a signal. In removing the effects of distortion, Schafer predistorts the signal and later removes the predistortion to achieve the desired signal.

SUMMARY OF THE INVENTION

It is an object of this invention to restore seismic data to missing or null traces contained within a seismic record.

It is another object of this invention to spatially extrapolate seismic traces consistent with acquired seismic data.

It is a feature of this invention to restore seismic data to missing or null traces contained within a seismic record utilizing a single, non-iterative procedure equivalent to a generalized Papoulis-Gerchberg iteration utilizing a data localizing transform of the seismic record.

It is an advantage of this invention to exploit the generalized bandlimitedness of seismic data to restore missing seismic data.

A seismic section comprised of a plural number of seismic traces, at least one of which either contains no seismic data or is severely contaminated by noise, is acquired by conventional seismic exploration techniques. Missing or severely noise contaminated seismic traces are identified as "null" traces and zeroed out. A transform sequence is produced by transforming the seismic section into a space which localizes the data components of the seismic traces into limited portion of the transform space. The transform sequence is muted to retain only the localized data components such that areas not corresponding to coherent energy are zeroed out. The muted transform sequence is then inverse-transformed back to the x-t domain, thereby producing x-t domain traces corresponding to the null traces. The produced x-t domain traces are identified as first estimates of the restored traces and substituted for the corresponding null traces in the original seismic section. Fully restored traces corresponding to the null traces of the seismic section are then determined directly from the single estimate of the restored traces.

The above and other objects, advantages and features of the invention will be more readily understood from the following detailed description of the invention, which is provided in connection with the accompanying drawings.

DEFINITION OF TERMS

In the detailed description of the invention set forth below, the application of the described techniques to "restore" missing or null seismic data utilizing a single, non-iterative procedure equivalent to a generalized Papoulis-Gerchberg iteration of a "data localizing" or "band-limited" function is set forth.

For purposes of this application, a "data localizing" or "band-limited" function is defined as a function for which its energy E is finite and the data component of its transform space F(w) is zero outside the finite interval set forth below as Equation (1):

$$F(w)=0, \text{ for } |w|>\sigma \tag{1}$$

By "restoration" of seismic data, it is intended to refer to methods which produce seismic data closely approximating seismic data actually collected or intended to be collected during exploration but for any number of reasons such as recording substantial amounts of noise together with the data or failing to record all of the produced data, was unacceptable for processing.

It is to be clearly understood, however, that the techniques set forth herein are equally applicable to seismic extrapolation techniques. By "extrapolation" of seismic data, it is intended to refer to the extension of seismic data to include locations where no data collection was conducted. The most common example is to extrapolate a seismic section to a finer spatial sampling. For example, geophones may have been spaced 50 feet apart during exploration. However, due to the results of the exploration, a finer spatial sampling which would be produced by spacing geophones 25 feet apart may be desired. As it may not be possiblie to conduct the additional exploration necessary to produce the finer spatial sampling due to time or financial constraints, the extrapolation of seismic data to produce seismic traces corresponding to supposed geophone locations where seismic data was not, in fact, collected will often be a satisfactory solution. While less common, extrapolation may also refer to the extension of the collected seismic data to supposed geophone locations beyond the furthest extent of the line of exploration.

It should also be understood that the techniques described herein are equally applicable to other seismic processing techniques as well. For example, the techniques herein described would prove satisfactory in removing the socalled "edge effects" resulting from f-k processing of seismic data. Recorded coherent events often terminate abruptly at the edge of a seismic record. The abrupt termination of coherent events produce considerable processing noise when the seismic record is analyze using f-k processing techniques. The methods described herein, in addition to restoring samples corresponding to null traces, provide the added benefit of reducing edge effects which occur during f-k processing of seismic data.

DESCRIPTION OF THE INVENTION

1. Theory of the Invention

The Papoulis-Gerchberg procedure provides an iterative method for determining the Fourier transform $F(w)$ of a band limited function $f(t)$ satisfying the criteria set forth in Equation (1) in terms of the finite segment $g(t)$ of $f(t)$. The Papoulis-Gerchberg procedure commences by Fourier transforming $g(t)$:

$$G(w) = G_0(w) = \int_{-T}^{T} g(t)e^{-jwt} dt \quad (2)$$

of the given segment $g(t) = g_0(t)$. The nth iteration step proceeds according to the following series of steps. First, the function $F_n(w)$ is formed according to Equation (3) below:

$$F_n(w) = G_{n-1}(w) p_\sigma(w), \quad \begin{aligned} p_\sigma(w) &= \begin{cases} 1, & |w| < \sigma \\ 0, & |w| > \sigma \end{cases} \end{aligned} \quad (3)$$

and its inverse transform is computed according to the following:

$$f_n = F_n(w)e^{jwt} dw \quad (4)$$

Next, $g_n(t)$ is formed according to Equation (5):

$$g_n(t) = f_n(t) + [f(t) - f_n(t)] p_\sigma(t) = \begin{cases} g(t), & |t| < T \\ f_n(t), & |t| > T \end{cases} \quad (5)$$

by replacing the segment $f_n(t)$ in the interval $(-T,T)$ by the known segment $g(t)$ of $f(t)$. The nth step ends by computing the transform:

$$G_n(w) = \int_{-\infty}^{\infty} g_n(t)e^{-jwt} dt \quad (6)$$

of $g_n(t)$. As $f_n(t)$ and $F_n(w)$ approach $f(t)$ and $F(w)$, respectively, as n approaches infinity, iterating the Papoulis-Gerchberg procedure is a method for computing the Fourier transform $F(w)$ and extrapolating a band-limited function $f(t)$ by application of its Fourier transform.

Teachings of the Papoulis-Gerchberg iteration are limited to extrapolations applying the Fourier transform. It is our invention to modify the Papoulis-Gerchberg iteration to extend to other types of transformations by exploiting the characteristic of generalized bandlimitedness attributable to numerous transforms. By generalized bandlimitedness, it is intended to refer to the existence of a space or representation of the data in which the data would appear to occupy a limited bandwidth or region of the transform space. Thus, if one views the coordinates of the transform space a generalized "frequencies" (although for most transformations the transform space would not, in fact, be a frequency domain such as that produced by the Fourier transform), one may reach the conclusion that data missing in the x-t domain will lead to spectral broadening in the so-called "generalized frequency" space. In other words, the presence of missing or incompletely restored samples in the x-t space will lead to the transformed data occupying a larger region in the transform space than the completely restored transformed data would be expected to occupy. By restoring missing samples in the x-t space such that this generalized spectral broadening is minimized or eliminated, restoration of data values consistent with surrounding data is possible.

Figure 2A:
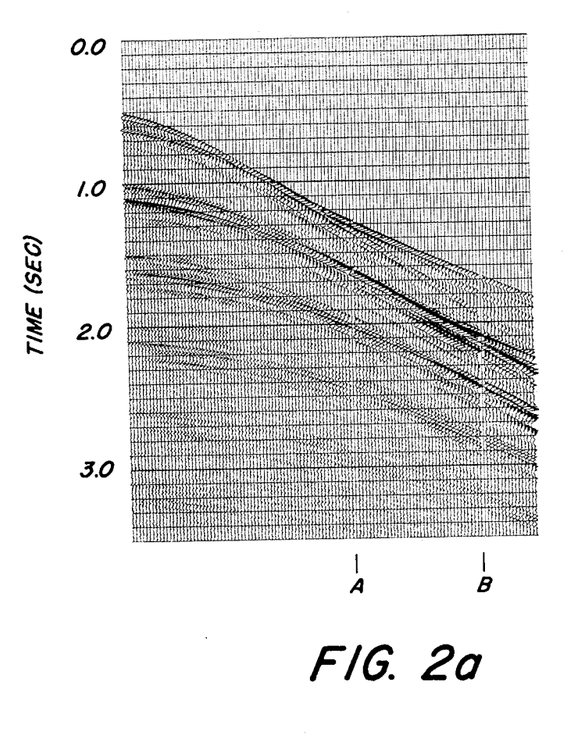
FIG. 2a illustrates an actual x-t domain shot record of a series of seismic traces which includes missing or null traces.
Figure 2B:
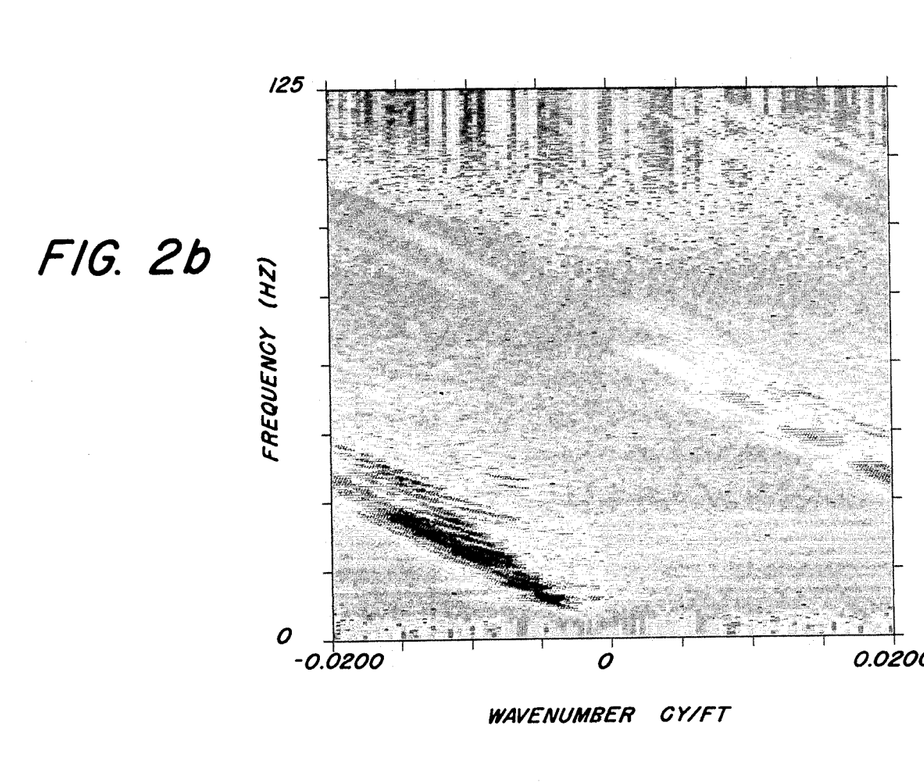
FIG. 2b illustrates the shot record of FIG. 2a transformed into f-k space.

F-k space comprises one example of a space in which a single, non-iterative procedure equivalent to a generalized Papoulis-Gerchberg iteration could be used to restore missing data provided that the transform of the proposed function meets the criteria set forth in the above definition of "data localizing" or "band-limiting" function. For the f-k transform space, when the original seismic data is transformed from the time domain into f-k space, the data is concentrated into regions which correspond to a few velocities. For example, FIG. 2a illustrates a seismic section and FIG. 2b illustrates the f-k transformation of FIG. 2a. An analysis of FIG. 2b by one skilled in the art of seismic processing clearly indicates that the data components of the x-t domain seismic data have become concentrated into regions in the f-k space corresponding to a few velocities.

Other examples of transform spaces in which seismic data is localized or bandlimited as defined above would include the well-known "F,kx,ky" space, "p-tau" space, "$x^2$-$t^2$" space as well a coordinate systems associated with wave equations transformations with either Kirchoff or finite difference extrapolators. When seismic data is transformed from the x-t domain to any of the abovelisted transform spaces, the transform space occupied by the seismic data is localized or bandlimited. Often, the data will be concentrated into a limited frequency bandwidth. For example, the transformation of x—y—t domain data into "F,kx,ky" space will typically focus monochromatic components of plane waves impinging on a surface area array into points. Transforming x-t domain data into "p-tau" space will focus linear events in the x-t domain into points. Transforming x-t domain data into "$x^2$-$t^2$" space will concentrate hyperbolic events into straight lines. Similarly, numerous well-known redatuming procedures and migrations will focus diffracted energy in the x-t domain into points or well defined edges in transform space. In all these cases, as well as others not explicitly set forth herein, missing data can be expected to broaden the region occupied by the transform representation of the data while recorded data is limited in the transform space.

The prior applications of the Papoulis-Gerchberg iteration required repeated calculations. It is our further invention that only a single, non-iterative procedure equivalent to a generalized Papoulis-Gerchberg iteration set forth herein is required to determine the restored seismic data.

Matrices R, T, TINV, M, C, and A which are used to partially restore a seismic record can be calculated such that:

$$R = C^*TINV^*M^*T^*A \qquad (7)$$

where:

T=matrix of dimension N×N for transforming the N dimensional data vector, i.e. the recorded seismic data, into a transform space satisfying the above definition of a data localized or band-limited transform space;

TINV =inverse matrix of dimension N×N for inverse transforming data from the transform space back to the original data space;

M=matrix of dimension N×N for muting out all samples in the transform space outside the so-called "bandwidth" which the transformed data is limited to;

C=matrix of dimension m×N for extracting partially restored samples from a data vector and placing them in order in an m dimensional vector, i.e. the vector of partially restored samples;

A=matrix of dimension N×m for augmenting a vector of partially restored samples by placing them at the positions of the original missing data to which they correspond and filling in zeroes at other positions.

Direct application of Equation (7) at this point would require, however, explicit expressions for the matrices C, TINV, M, T and/or A. It is possible, however, to avoid the requirement for such explicit expressions and still solve for R in the following method.

Constructing m test vectors $v_1, v_2, \ldots, v_m$ according to the following criteria:

transpose of $v_1$ = (1.0, 0.0, 0.0, ..., 0.0) \qquad (8)

transpose of $v_2$ = (0.0, 1.0, 0.0, ..., 0.0)

.
.
.

transpose of $v_m$ = (0.0, 0.0, 0.0, ..., 1.0), it is possible to perform the operations corresponding to $R^*v_j$ without explicit expressions for the matrices A, T, M, TINV, or C by applying the operations in order to the vector $v_j$.

For example, defining a vector $w_j$ such that:

$$w_j = R^*v_j \qquad (9)$$

and computing $w_j$ for j=1, 2, ..., m, it will follow that:

$$R(i,j) = ith\ component\ of\ w_j \qquad (10)$$

In such a manner, all of the values of R may be computed. Symmetries of R can be used to reduce the computations but R needs to be computed only once. Because R is independent of the data itself and depends only on the geometry and nature of the transformation and the expected data limiting characteristics the data in the transform space, many data sets may be restored using matrix R.

Having computed R a single time, data can be partially restored as follows. First, let $x_0$ equal the original data with zeroes inserted for the m missing data values and define $x_{1hat} = C^*TINV^*M^*T^*x_0$. Thus m dimensional vector $x_{1hat}$ is obtained by transforming the N dimensional vector, $x_0$, into transform space, muting out all components outside a "band-limited" region believed to correspond to the restored data, inverse transforming back to the data space, extracting the partially restored values produced by the inverse transform and putting the produced partially restored values into a vector $x_{1hat}$. We define a generalized Papoulis-Gerchberg procedure producing $x_{1hat}$ as its first step, and after n −1 aditional steps, produces $x_{nhat}$. The vector $x_{nhat}$ can then be computed from:

$$x_{nhat} = [I + R + R^{}2 + \ldots + R^{n-1}]^*x_{1hat} \qquad (11a)$$

If the matrix power series set forth in brackets above converges, then it converges to the inverse of I-R and the limit of the generalized Papoulis-Gerchberg iteration can be computed without recourse to the expensive iterative procedure. In such a manner, the necessity of performing iterative computations to determine if the iteration converges is avoided. To determine if the iteration will converge, the eigenvalue of R with the largest modulus is first computed. Convergence is assured if the modulus of the computed eigenvalue is less than unity. Convergence is achieved by application of Equation (11b) below:

$$x_{hat} = [inverse\ of\ (I-R)]^*x_{1hat} \qquad (11b)$$

where:

$x_{hat}$=an m-dimensional vector of completely restored samples resulting from an indefinitely long Papoulis-Gerchberg iteration;

$x_{1hat}$=an m-dimensional vector of partially restored samples after one iteration; and I-R =Identity matrix—R matrix.

As would typically be the case, the matrix I-R must be determined to be non-singular to ensure that the desired inverse matrix I-R exists. This requirement is guarenteed, however, if the largest eigenvalue of R has modulus less than units.

The theory set forth above will now be applied to determine a series of completely restored samples from a single determination of a series of partially restored samples. The example herein described utilizes one type of transform space which meets the required data limiting characteristics—the f-k transform.

For illustration, suppose the seismic x-t data contains linear events with a single velocity. If all the traces are Fourier transformed into f-x space, each frequency component will correspond to a spatial sequence of a single spatial frequency. If a single trace is missing, each of these spatial sequences will have a single sample missing.

Using the following model to represent a spatial sinusoidal sequence:

$$x(n) = \sin(2*pi*k'*dk*n*dx) \quad (12)$$

for:
n=0,1,2, ..., N−1
k' is between (0 ... N−1)=0, 1, 2, ..., N−1
where:
pi~3.14159;
k'*dk=spatial frequency (wave number) of the sequence;
dx=spatial sample interval; and
dk*dx=1.0/N When no missing sample is present, the wave number spectrum complex of one component at wave number k'*dk. The sequence with a missing sample at location m can be represented as the sum of the uninterrupted single plus a sequence consisting of zeros at every sample except for a value of −x(m) at the location m corresponding to the location of the missing sample, or gap.

The discrete Fourier transform (hereafter abbreviated as "DFT") of a N-point sequence x may be represented as:

$$X(k) = \sum_{m=0}^{N-1} x(m) e^{(j2\pi km/N)} \quad (13)$$

for:
k=0,1, ..., N−1;
wherein the sum is over m=0, 1, 2, ..., N−1.

The DFT of an ungapped sinusoidal spatial sequence is [0, 0, ..., N, 0, 0, ..., 0] where the non-zero component occurs at location k' corresponding to the wave number of the sinusoidal sequence x. The DFT of the gapped sequence is the sum of the transform of the ungapped sequence plus the transform of the sequence [0, 0, ..., −x(m), ..., 0].

Because the transform of the second sequence is:

$$X(k) = -x(m)*e^{j2\pi km/N} \quad (14)$$

at all wave numbers, the transformed, gapped sequence is seen to have a broadband wave number spectrum. However, the broadband part of the spectrum corresponding to the presence of the gap has a smaller amplitude than the narrow band part of the spectrum corresponding to the coherent events of which restoration is sought.

Furthermore, if the gapped data were filtered so as to pass only the wave number component corresponding to the ungapped sequence, much of the effect of the gap would be removed. Consequently, a filtered, gapped sequence would have a non-zero sample filling in the gap. For these reasons, a procedure to restore a missing sample in x-t data whose f-k spectrum is such that for each frequency the wave number spectrum is narrow band, is possible. The partially restored x-t data would be obtained by transforming the muted f-k data back to the x-t domain. A single application of the x-t to f-k transformation, f-k muting, and f-k to x-t transformation will yield a trace containing partially restored seismic data for substitution for the null trace of the original seismic record.

Next, the first determination of the partially restored samples is used to calculate the fully restored samples for the desired trace. Recalling that during the first determination of the missing trace, the transform of the obtained seismic data (including the gap) into the f-k domain yielded:

$$X_0(k) = SUM[x(n)*e^{(j2\pi kn/N)}] \quad (15)$$

for
k=0,1, ..., N−1,
where the sum is over n=0,1,2, ..., N−1 and x(m)=0.

After inspecting the wave number amplitude spectrum ABS (absolute value) ($|X_0(k)|$) to identify the wave numbers corresponding to coherent events, the restored sample was obtained by filtering the data to retain only those coherent events previously identified. This was accomplished by an inverse DFT with non-coherent components zeroed out. Thus the restored sample $x_1(m)$ may be represented by:

$$x_1(m) = (1.0/N)*SUM[X_0(k)*e^{(-j2\pi mk/N)}] \quad (16)$$

where the sum is only over wave numbers associated with coherent events.

The second iteration of the method of the present invention would yield:

$$X_1(k) = SUM[x(n)*e^{(j2\pi nk/N)}] + x_1(m)*e^{(j2\pi mk/N)} \quad (17)$$

where the sum is over all samples, n=0,1, ..., N−1 except for n=m.

Therefore:

$$X_1(k) = X_0(k) + x_1(m)*e^{2j\pi mk/N}. \quad (18)$$

and $$x_2(m) = (1.0/N)*SUM[X_1(k)*e^{-(j2\pi mk/N)}] \quad (19)$$

where the sum is only over wave numbers associated with coherent events

Next, it may be determined that:

$$x_2(m) = x_1(m) + x_1(m)*(1.0/N)*SUM[1] \quad (20)$$

where the sum is only over wave numbers associated with coherent events.

Defining r as the following:

$$r = (1.0/N)*(\text{number of coherent event wave numbers}) \quad (21)$$

Then Equation (19) provides that for two iterations:

$$x_2(m) = x_2(m)*[1.0+r]. \quad (22a)$$

Further, for M iterations, Equation (21) would become:

$$x_M(m) = x_1(m)*[1.0 + r + r^2 + r^3 + \ldots + r^{(M-1)}]. \quad (22b)$$

Providing that r<1, which is true whenever fewer coherent events are restored than the number of spatial samples, the sequence converges, and the limit of the restored sample, $x_{inf}(m)$ is given by the following equation:

$$x_{inf}(m) = x_1(m)*[1.0/(1.0-r)]. \quad (23)$$

By applying Equation (23) to the first iterative determination $x_1(m)$ of the restored sample, the restored sample value equivalent to an infinite number of iterations may be determined while requiring only a single iteration to obtain $x_1(m)$.

Figure 1:
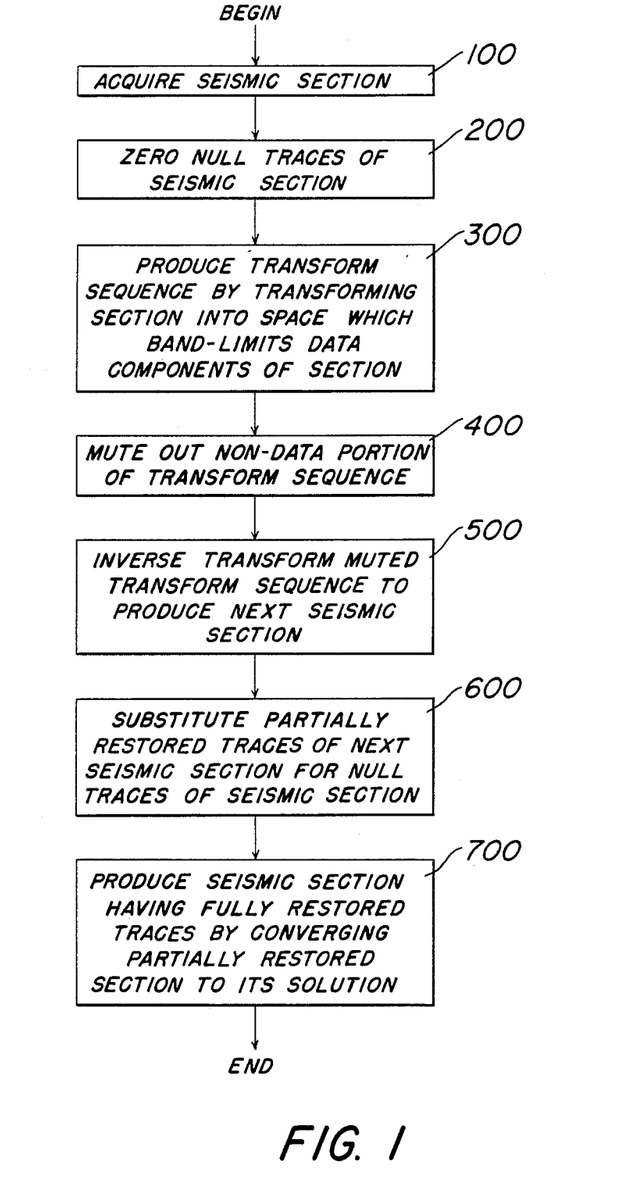
FIG. 1 illustrates, in flow chart form, the method of seismic trace restoration of the present invention.

2. Method of the Invention:

Turning now to FIG. 1, the method of restoring seismic traces in accordance with the present invention is described.

The method of the present invention commences at step 100 with the acquisition of seismic data using well known seismic exploration techniques. For example, an artificial disturbance may be generated along a line on the earth by the use of dynamite or other seismic energy sources. The resulting acoustic waves travel downwardly in the earth and are reflected upward from subsurface reflecting interfaces. The reflected waves are received at geophones or other detectors located along the surface and recorded in reproducible form as seismograms representing the amplitude of seismic reflections as a function of time and distance along a line of exploration in the x direction of the earth's surface.

Seismic traces which would be acquired by conventional seismic surveys may be seen by reference to the drawings. For example, FIG. 2a illustrates a marine line shot which includes at missing or null traces. The shot record illustrated here is characterized by strong direct arrivals and far offset multiples. In the past, an f-k filter would have been applied to remove the direct arrivals and far offset multiples. However, the missing trace and adjacent traces would be seriously corrupted by noise large enough to interfere with additional processing.

Figure 3A:
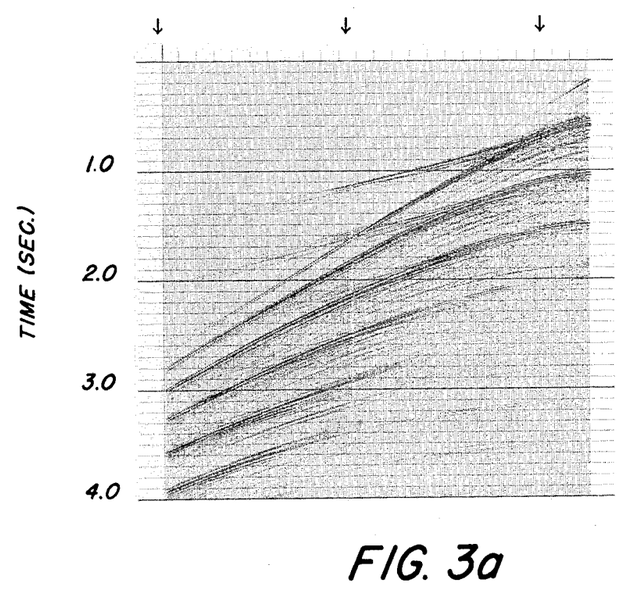
FIG. 3a illustrates a second actual x-t domain shot record of a series of seismic traces which includes missing or null traces.

FIG. 3a illustrates a CDP shot record recorded from a seismic survey. Again, missing traces attributable to missed shots are present. This shot record is severely contaminated by multiples, a common problem which occurs in some seismic surveys.

Returning to FIG. 1 and proceeding to step 200, any of the collected seismic traces which have either no recorded data or clearly contain severe contamination are excluded from the data set as "null" traces. Exclusion may be accomplished by zeroing out all data recorded on the traces identified as "null". For example, in FIG. 2a, traces "A" and "B" are indicative of null traces where no seismic data has been recorded.

Figure 3B:
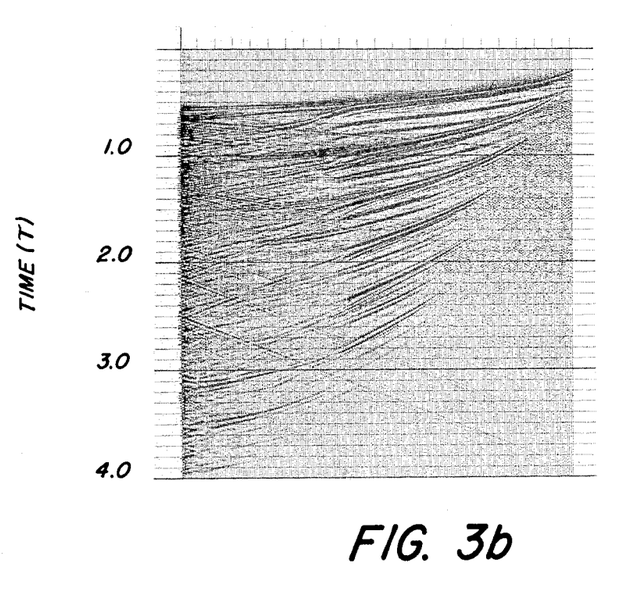
FIG. 3b illustrates the shot record of FIG. 3a transformed into tau-p space.

At step 300, a transform sequence is produced by transforming the seismic section into a space which band-limits the data components of the seismic section. For example, FIG. 2b illustrates the section of FIG. 2a transformed into f-k space such that the data components of the seismic section are band-limited. Such an f-k transformation may by performed in accordance with the methods set forth in U.S. patent application Ser. No. 148,307, previously incorporated by reference. Alternately, a transform sequence may be produced by transforming the seismic section into tau-p space, an alternate transform space which satisfies the previously stated requirements for band-limiting the data components of the seismic section. The tau-p transform, also referred in the art as "slant stacking", may be accomplished according to the methods disclosed in U.S. Pat. No. 4,628,492 issued to Winney. For example, FIG. 3a illustrates a seismic section including several null traces. In FIG. 3a, null traces included in the seismic section are identified by arrows. The transformation of the seismic section illustrated in FIG. 3a into tau-p space is illustrated in FIG. 3b.

At step 400, the transform sequence is examined to identify those areas containing primarily data components. A mute window is then designed and applied to the transform sequence to remove the non-data portions of the transform sequence. Such muting may be readily accomplished as the method of the present invention requires that the transform sequence be such that data is band-limited to certain portions of the transform space which are easily recognizable and mutable. In such a manner, the transform sequence is examined to identify the regions of transform space which would represent the data if it had already been completely restored. Analysis of synthetic data based on models and analysis of similar data in the same transform space with no missing traces may be used to determine the generalized bandwidth of the complete data. Based on this analysis, a mute to pass only the components of the transform sequence which ar associated with the complete data is permitted. More specifically, components of the transform sequence except those corresponding to complete data are muted.

Figure 2C:
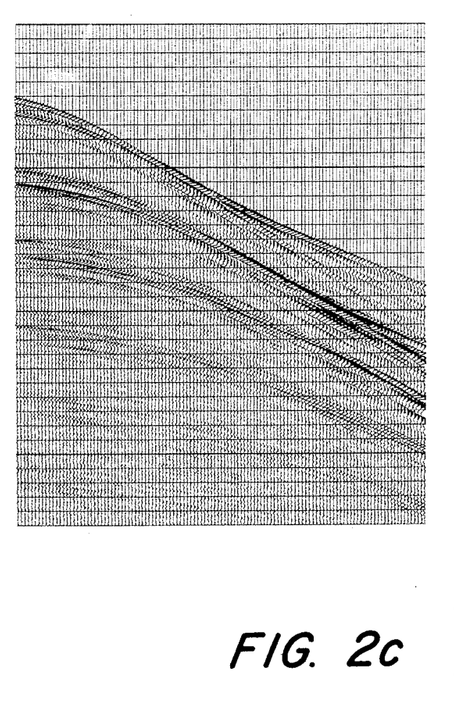
FIG. 2c illustrates the f-k space of FIG. 2b inversed transformed into the x-t domain after muting out non-data components in f-k space.
Figure 2D:
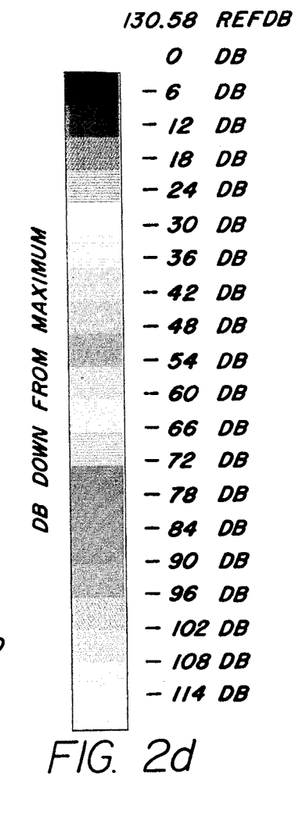
Figure 3C:
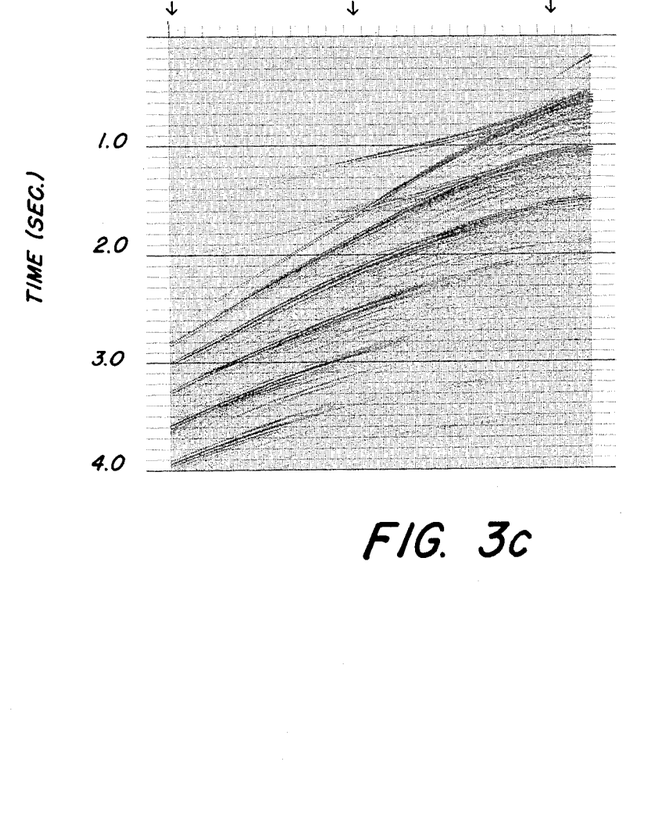
FIG. 3c illustrates the tau-p space of FIG. 3b inverse transformed into the x-t domain after muting.

Proceeding to step 500, the muted transform sequence is inverse transformed back to the x-t domain. Because the data was altered in the transform space, the inverse transform of the muted transform sequence will not reconstruct zeroes for the original missing or artificially zero samples. Instead, the inverse transform of the muted transform sequence will include non-zero samples, either partially restored or partially interpolated, in place of the previously null samples. For example, see the restored traces illustrated in FIGS. 2c and 3c which were produced by the inverse transform of the f-k spectrum of FIG. 2b and the inverse transform of the tau-p spectrum of FIG. 3b, respectively, after muting the non-data component areas.

However, the inverse transform of the muted transform sequence also causes all of the other samples of the unmuted data to have been replaced by new data. Because the original samples are, with the exception of the null samples, considered to be good data, it is not desirable to replace the original non-null samples with the samples produced by the inverse transform of the muted transform sequence. Accordingly, at step 600, all of the filtered x-t traces except the x-t traces which corresponds to the null traces are discarded and the remaining x-t traces produced by the inverse transform of the muted transform sequence are substituted in the original seismic section for the null traces to complete the first iteration of producing restored traces for the null traces.

Proceeding to step 700, the fully restored traces are now produced by converging the partially restored section to its solution. The converged solution for each frequency component is determined according to the following equation:

$$x_{hat} = [\text{inverse of } (I-R)^* x_{1hat}] \tag{11b}$$

where:

$x_{hat}$ = an m-dimensional vector of completely restored samples resulting from an indefinitely long Papoulis-Gerchberg iteration;

$x_{1hat}$ = an m-dimensional vector of partially restored samples after one iteration;

R = C*TINV*M*T*A; and

I-R = Identity matrix—R matrix.

Thus, there has been described and illustrated herein methods for restoring missing or null seismic traces utilizing a single, non-iterative procedure equivalent to a generalized Papoulis-Gerchberg iteration for a transform which band-limits the acquired seismic data. However, those skilled in the art will recognize that many modifications and variations besides those specifically set forth may be made in the techniques described herein without departing substantially from the concept of the present invention. Accordingly, it should be clearly understood that the form of the invention described herein is exemplary only, and is not intended as a limitation on the scope of the claims.

What is claimed is:

1. A method of restoring seismic data to a null trace included as part of a series of seismic traces comprising steps of:
   a single non-iterative procedure for a transform which band limits acquired data, by producing a data localizing transform representation of said series of seismic traces;
   applying a mute capable of passing only the localized data portion of said localized data transform space corresponding to said transformed series of seismic traces;
   producing a second series of seismic traces from said muted transform, said second series of seismic traces including a partial restoration of said null trace;
   substituting said partially restored trace for said null trace in said first series of seismic traces; and
   producing a seismic section which includes a full restoration of said null trace from said substituted series of seismic traces.

2. The method according to claim 1 wherein the step of applying a mute capable of passing only said localized data corresponding to said transformed series of seismic traces further comprises the steps of:
   examining the transform representation to identify regions of said transform space which would represent fully restored data; and
   designing a mute to pass only components of the transformed data associated with the fully restored data.

3. The method according to claim 2 wherein the step of examining the transform representation to identify regions of said transform space which would represent fully restored data further comprises the step of comparing said transform space to analysis of similar data with no missing traces to determine the bandwidth of the complete data.

4. The method according to claim 1 wherein the step of producing a seismic section which includes a full restoration of said null trace from said substituted series of seismic traces further comprises the step of determining a completely restored trace $x_{hat}$ for said null trace, said completely restored trace determined according to the following relationship:

$$x_{hat} = [\text{inverse of } (I-R)] * x_{1hat}$$

where:
   $x_{1hat}$ = said partially restored trace;
   $R = C*TINV*M*T*A$; and
   $I-R$ = Identity matrix—R matrix.

5. The method according to claim 4 wherein the step of applying a mute capable of passing only said localized data corresponding to said transformed series of seismic traces further comprises the steps of:
   examining the transform representation to identify regions of said transform space which would represent fully restored data; and
   designing a mute to pass only components of the transformed data associated with the fully restored data.

6. The method according to claim 5 wherein the step of examining the transform representation to identify regions of said transform space which would represent fully restored data further comprises the step of comparing said transform space to analysis of similar data with no missing traces to determine the bandwidth of the complete data.

7. The method according to claim 6 wherein the transform space is f-k transform space.

8. The method according to claim 6 wherein the transform space is tau-p transform space.

9. The method according to claim 6 wherein the transform space is f,kx,ky space.

10. The method according to claim 6 wherein the transform space is $x^2$-$t^2$ space.

11. In seismic exploration wherein seismic sources are activated at spaced locations along a line of exploration and the amplitude of reflections are recorded as a function of time along said line to produce a series of seismic traces, said series of seismic traces including at least one null trace, a method of restoring seismic data for said at least one null trace comprising single non-iterative procedure for a transform which band limits acquired data, by steps of:
   producing a data localizing transform representation of said series of seismic traces;
   applying a mute capable of passing only the localized data portion of said localized data transform space corresponding to said transformed series of seismic traces;
   producing a second series of seismic traces from said muted transform, said second series of seismic traces including a partial restoration of said null trace;
   substituting said partially restored trace for said null trace in said first series of seismic traces; and
   determining a completely restored trace $x_{hat}$ for said null trace, said completely restored trace determined according to the following relationship:

$$x_{hat} = [\text{inverse of } (I-R) * x_{hat}]$$

where:
   $x_{1hat}$ = said partially restored trace;
   $R = C*TINV*M*T*A$; and
   $I-R$ = Identity matrix—R matrix.

12. The method according to claim 11 further comprising the step of producing a seismic section which includes a full restoration of said null trace from said series of seismic traces and said fully restored trace.

13. The method according to claim 11 wherein the step of applying a mute capable of passing only said localized data corresponding to said transformed series of seismic traces further comprises the steps of:
   examining the transform representation to identify regions of said transform space which would represent fully restored data; and
   designing a mute to pass only components of the transformed data associated with the fully restored data.

14. The method according to claim 13 wherein the step of examining the transform representation to identify regions of said transform space which would represent fully restored data further comprises the step of comparing said transform space to similar data with no missing traces to determine the bandwidth of the localized data.

15. The method according to claim 14 wherein the transform space is f-k transform space.

16. The method according to claim 14 wherein the transform space is tau-p transform space.

17. The method according to claim 14 wherein the transform space is f,kx,ky space.

18. The method according to claim 14 wherein the transform space is $x^2$-$t^2$ space.

* * * * *